United States Patent [19]

Furukawa et al.

[11] Patent Number: 5,122,651
[45] Date of Patent: Jun. 16, 1992

[54] DEVICE FOR MEASURING LUMINANCE OF FLUORSCENT SCREEN OF CATHODE RAY TUBE

[75] Inventors: Hiroshi Furukawa; Yoshihiro Okui; Kazuhiko Naruse, all of Osaka, Japan

[73] Assignee: Minolta Camera Kubushiki Kaisha, Osaka, Japan

[21] Appl. No.: 550,636

[22] Filed: Jul. 10, 1990

[30] Foreign Application Priority Data

Jul 12, 1989 [JP] Japan .................. 1-181432

[51] Int. Cl.⁵ .......................................... H01J 40/14
[52] U.S. Cl. .............................. 250/214 R; 250/484.1; 358/138
[58] Field of Search ............ 250/214 R, 483.1, 484.1; 315/368; 358/138, 139

[56] References Cited

U.S. PATENT DOCUMENTS 4,933,558  6/1990  Carter et al. ............... 250/484.1
5,032,769  7/1991  Kawakami ................... 358/139

OTHER PUBLICATIONS

Brochure of the Minolta Camera Co. disclosing a TV Color Analyzer II, at p. 11, Apr. 1989.

Primary Examiner—David C. Nelms
Assistant Examiner—S. Allen
Attorney, Agent, or Firm—Price, Gess & Ubell

[57] ABSTRACT

A device for measuring a luminance of a fluorescent screen of a cathode ray tube includes a photoelectric conversion device for receiving light from the fluorescent screen and converting the light to electrical energy, an integral device for integrating the electrical energy, a measurement device for measuring the glowing interval time of the cathode ray tube, and a control device for controlling the integral device so as to integrate the electric energy for a general integral time corresponding to the interval time. Also, this device has a calculation device for calculating an offset integrated electrical energy corresponding to a bias component of the photoelectric conversion device, another calculation device for calculating a true integrated electrical energy by subtracting the offset integrated electrical energy from the measured general integrated electrical energy.

25 Claims, 10 Drawing Sheets

FROM STEP #20

TO STEP #50

FROM STEP #135

TO STEP #145

DEVICE FOR MEASURING LUMINANCE OF FLUOURSCENT SCREEN OF CATHODE RAY TUBE

BACKGROUND OF THE INVENTION AND RELATED ART STATEMENT

This invention relates to a device for measuring a luminance of a fluorescent screen of a cathode ray tube.

Luminance measurement devices for a cathode ray tube (referred to as CRT hereinafter) have been so designed as to receive light from the fluorescent screen in synchronism with a vertical synchronizing signal to the CRT in order to assure an accurate measurement. Conventional luminance measurement devices have a fixed integral time of 100 milliseconds during which electric energy obtained by a photoelectric conversion element is integrated and then converted to a digital signal because synchronizing signals of many television CRTs have a fixed frequency of 50 Hz or 60 Hz.

These conventional luminance measurement devices provide an accurate measurement as a result of the long integral time. Conversely, they are difficult to perform fast signal processing and fast luminance measurement.

Also, CRTs for graphic display have various frequencies of vertical synchronizing signal which are from 40 Hz to 80 Hz. In such CRTs, the conventional luminance measurement devices having a fixed integral time cannot provide accurate measurements for all the CRTs having different frequencies of vertical synchronizing signals.

SUMMARY OF THE INVENTION

Accordingly, it is an object of the present invention to provide a device for measuring the luminance of a fluorescent screen of a CRT which has overcome the above-mentioned drawbacks.

According to the present invention, a device for measuring a luminance of a fluorescent screen of a cathode ray tube comprises photoelectric conversion means for receiving light from the fluorescent screen and converting the light to electrical energy, integral means for integrating the electrical energy, glowing interval time measurement means for measuring the glowing interval time of the cathode ray tube, and control means for controlling the integral means so as to integrate the electric energy for a general integral time corresponding to the measured interval time. The general integral time period corresponds to a scanning integral display time period of the CRT which can be measured from an initial addressing of a pixel position on the CRT to enable a luminance glowing to a subsequent addressing of the same pixel position on the CRT during the subsequent scan cycle.

Also, according to the present invention, a device for measuring a luminance of a fluorescent screen of a cathode ray tube comprises photoelectric conversion means for receiving light from the fluorescent screen and converting the light to electrical energy, integral means for integrating the electrical energy, first setting means for setting a first integral time, the first integral time being determined before measuring the luminance, second setting means for setting a second integral time, the second setting means including glowing interval time measurement means for measuring the glowing interval time of the cathode ray tube, the second integral time corresponding to the measured interval time, selection means for selecting one of the first setting means and the second setting means, and control means for controlling the integral means so as to integrate the electrical energy for a general integral time corresponding to the integral time set by a selected setting means.

Further, according to the present invention, a device for measuring a luminance of a fluorescent screen of a cathode ray tube comprises photoelectric conversion means for receiving light from the fluorescent screen and converting the light to electrical energy, integral means for integrating the electrical energy, input means for inputting data corresponding to the glowing interval time of the cathode ray tube, calculation means for calculating the glowing interval time of the synchronizing signal based on the input data, and control means for controlling the integral means so as to integrate the electric energy for a general integral time corresponding to the calculated glowing interval time.

Further, according to the present invention, a device for measuring a luminance of a fluorescent screen of a cathode ray tube comprises photoelectric conversion means for receiving light from the fluorescent screen and converting the light to electrical energy, glowing detection means spaced apart from the photoelectric conversion means at a predetermined distance for detecting glowings of the fluorescent screen, first calculation means for calculating the glowing interval time of the cathode ray tube based on the detected glowings, integral time setting means for setting an integral time shorter than the calculated glowing interval time, first integral enable signal generator means for calculating, based on the predetermined distance and the set integral time, a first integral time to enable the photoelectric conversion means to receive a glowing light of the fluorescent screen within the set integral time, and generating a first integral enable signal at the calculated first integral time, second integral enable signal generator means for calculating, based on the predetermined distance and the set integral time, a second integral time to enable the photoelectric conversion means to receive no light of the fluorescent screen within the set integral time, and generating a second integral enable signal at the calculated second integral time, integral means responsive to the first integral enable signal generator means and the second integral enable signal generator means for producing a first integrated electrical energy corresponding to the first integral enable signal and a second integrated electrical energy corresponding to the second integral enable signal, and second calculation means for calculating a ture integrated electrical energy by subtracting the second integrated electrical energy corresponding to the second integral start signal from the first integrated electrical energy corresponding to the first integral start signal.

Further, according to the present invention, a device for measuring a luminance of a fluorescent screen of a cathode ray tube comprises photoelectric conversion means for receiving light from the fluorescent screen and converting the light to electrical energy, integral means for integrating electrical energy, first control means for controlling the integral means so as to integrate the electrical energy for a first integral time to produce a first integrated electrical energy, second control means for controlling the photoelectric conversion means so as to integrate an internal electrical energy of the photoelectric conversion means when in a state of receiving no light from the fluorescent screen to produce a second integrated electrical energy, and controlling the integral means so as to integrate the internal electrical energy for a second integral time to produce a third integrated electrical energy, calculation means for calculating a ture integrated electrical energy based on the first integrated electrical energy, the second integrated electrical energy, the first integral time, and the second integral time.

Further, according to the present invention, a device for measuring a luminance of a fluorescent screen of a cathode ray tube comprises photoelectric conversion means for receiving light from the fluorescent screen and converting the light to electrical energy, integral means for integrating electrical energy, first control means for controlling the integral means so as to integrate the electrical energy for a first integral time to produce a first integrated electrical energy, second control means for controlling the photoelectric conversion means so as to output an internal electric energy of the photoelectric conversion means when in a state of receiving no light from the fluorescent screen, and controlling the integral means so as to integrate the internal electric energy for a second integral time to produce a second integrated electrical energy, third control means for controlling the photoelectric conversion means so as to output the internal electric energy of the photoelectric conversion means when in a state of receiving no light from the fluorescent screen, controlling the integral means so as to integrate the internal electric energy for a third integral time different from the second integral time to produce a third integrated electrical energy, storage means for storing the first integrated electrical energy, the second integrated electrical energy, and the third integrated electrical energy, calculation means for calculating a true integrated electrical energy based on the first integrated electrical energy, the second integrated electrical energy, the third integrated electrical energy, the first integral time, the second integral time, and the third integral time.

These and other objects, features and advantages of the present invention will become more apparent upon a reading of the following detailed description and drawings.

DETAILED DESCRIPTION OF PREFERRED EMBODIMENTS OF THE INVENTION

Figure 1:
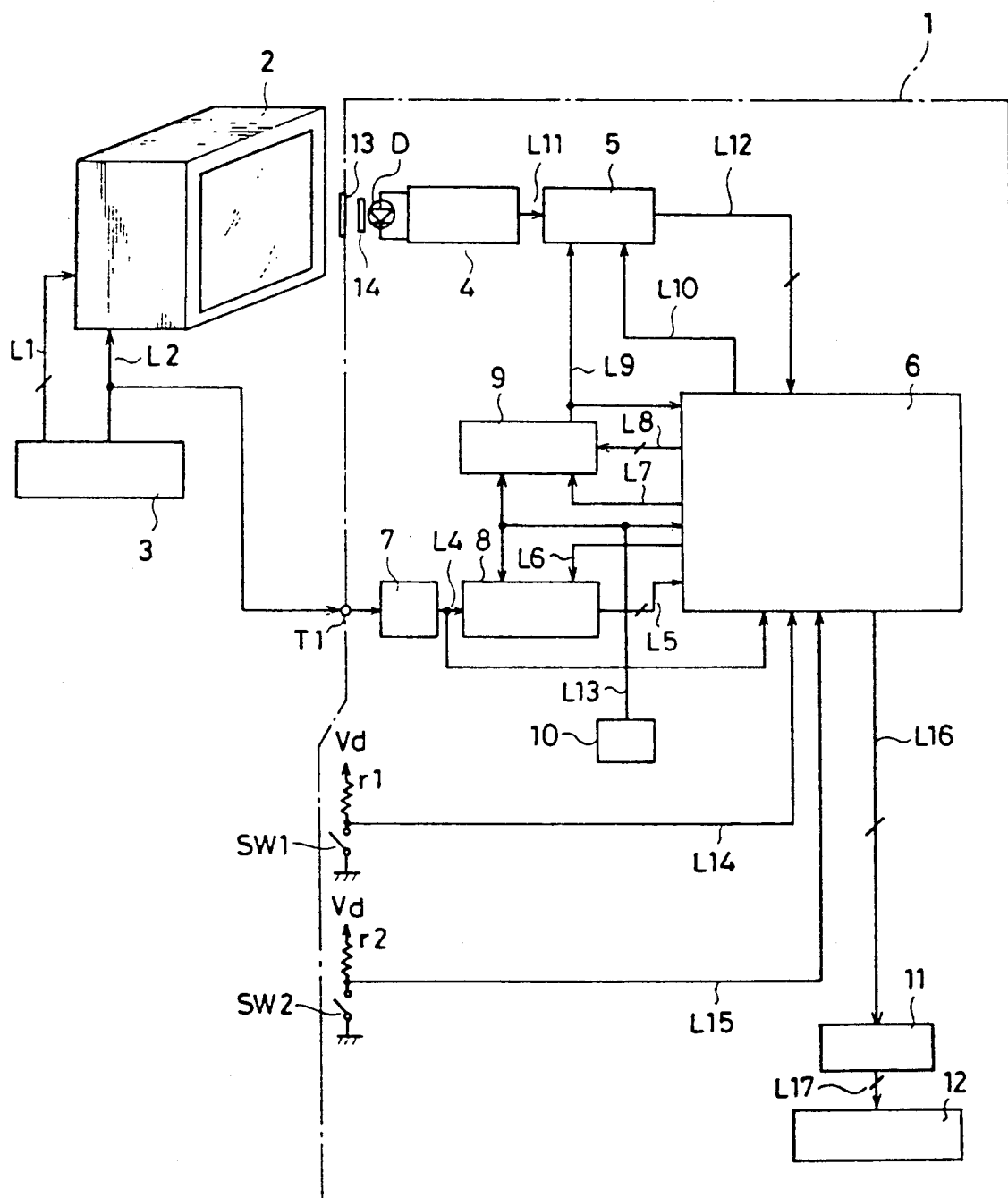
FIG. 1 is a diagram showing an overall measurement system using a first luminance measurement device of the present invention.

Referring to FIG. 1 showing an overall measurement system using a luminance measurement device of the present invention, indicated at 1 is the luminance measurement device of the present invention, indicated at 2 is a CRT to be measured, indicated at 3 is a pattern generator which sends a test pattern signal to the CRT 2 through signal lines L1 and L2. A vertical synchronizing signal of the test pattern signal is sent to the CRT 2 through the signal line L2. Indicated at D is a photoelectric conversion element which receives light from a fluorescent screen of the CRT 2 and converts it to an electric energy.

A diffuser 13 and a filter 14 are provided in front of the photoelectric conversion element D. The diffuser 13 is provided to diffuse light from a sampling area of the fluorescent screen of the CRT 2 so that the photoelectric conversion element D can receive the light uniformly. The filter 14 includes an optical member for permitting only light necessary for measurement.

Indicated at 4 is an impedance transformer for making an output of the photoelectric conversion element D correspond to an input level of an integral unit 5.

The integral unit 5 includes a well-known dual slope integral circuit. The integral time of the integral unit 5 is controlled by a control signal sent from a counter 9 (described later) through a signal line L9. The discharge timing of the integral unit 5 is controlled by another control signal sent from a control unit 6 through a signal line L10. It should be noted that in the drawings, signal lines provided with a mark (/) represent ones including a plurality of lines.

Indicated at T1 is an input terminal of the luminance measurement device 1 for receiving the vertical synchronizing signal from the test pattern generator 3. Indicated at 7 is a voltage converter for adjusting a voltage of the input vertical synchronizing signal to a voltage suitable for the luminance measurement device 1. The adjusted vertical synchronizing signal is then sent to the counter 8 and the control unit 6 through a signal line L4.

The counter 8 finds out the interval time or pulse period of the vertical synchronizing signal by counting the number of reference pulses sent from a reference pulse generator 10 through a signal line L13. More specifically, after receiving a counter enable signal sent from the control unit 6 through a signal line L6, the counter 8 starts counting of the number of reference pulses upon receiving one pulse of the vertical synchronizing signal and continues the counting until the next pulse of the vertical synchronizing signal, so that the interval time of vertical synchronizing signal is meansured. Thereafter, the counter 8 sends the result of the counting, i.e., the interval time to the control unit 6.

Indicated at 9 is a presettable counter for counting down an integral time for the integral unit 5. Into the counter 9 are sent an integral time data through a signal line L8 and a trigger signal from the control unit 6 through a signal line L7. When receiving the trigger signal, the counter 9 sends an integral start signal to the integral unit 5 through a signal line L9 and to the control unit 6. Simultaneously, the counter 9 counts down the integral time data to zero in accordance with reference pulses from the reference pulse generator 10 through the signal line L13. Upon counting down to zero, the counter 9 sends an integral stop signal to the integral unit 5 and the control unit 6.

In response to the integral stop signal, the control unit 6 sends a discharge signal to the integral unit 5 through a signal line L10. Thereafter, the control unit 6 receives a discharge complete signal from the integral unit 5 through a signal line L12, obtaining an A/D converted value data, practicing a predetermined calculation to provide a measurement value, and then sending the calculated measurement value to a display driver 11 through a signal line L16. The display driver 11 converts the measurement value into a suitable format for a display unit 12 and sends the measurement value to the display unit 12 through a signal line L17 to display the measurement value on the display unit 12.

A switch SW1 is adopted for selecting a measurement mode. More specifically, the switch SW1 is used to change the integral time of the integral unit 5 in accordance with the vertical synchronizing signal for the CRT 2 to be measured to ensure an optimum measurement condition.

In this embodiment are provided three measurement modes: a 50 Hz mode, a 60 Hz mode, and an external input mode where a vertical synchronizing signal having a frequency other than 50 Hz and 60 Hz is input from an external unit. The measurement mode is selected by changing codes stored in a register R1 (not shown) in the control unit 6. Table 1 shows the codes corresponding to the three measurement modes. Also, Table 2 shows the codes corresponding to integral times to be set in the counter 9 by the control unit 6. In Table 2. "m" represents an integer, and "Ta" represents an interval time or a pulse period of a vertical synchronizing signal, which is to be counted by the counter 8.

TABLE 1

| Codes in Register R1 | Measurement Modes |
|---|---|
| 1 | 60 Hz (NTSC) |
| 2 | 50 Hz (PAL) |
| 4 | External signal (EXT) |

TABLE 2

| Codes in Register R1 | Integral Times (second) |
|---|---|
| 1 | 1/60 or m/60 |
| 2 | 1/50 or m/50 |
| 4 | Ta or m · Ta |

A switch SW1 is an open type switch and provided between a signal line L14 and the ground. The signal line L14 connects a mode selection signal input port of the control unit 6 with a power source Vd through a resistor r1. Consequently, the mode selection signal input port is held in a high level at the usual time. The code of the register R1 is changed by turning on the switch SW1 to change the mode selection signal input port to a low level.

The control unit 6 sets the counter 9 in the integral time corresponding to a changed code in the register R1 as shown in Table 2. Also, the control unit 6 sends the changed code to the display driver 11 to display the measurement mode corresponding to the changed code on the display unit 12.

A switch SW2 is an open type switch and is provided between a signal line L15 and the ground for carry out zero calibration. The signal line L15 connects a calibration signal input port of the control unit 6 with a power source Vd through a resistor r2. Consequently, the calibration signal input port is held in a high level at the usual time. When the switch SW2 is turned on, the calibration signal input port is changed to a low level, so that a zero calibration program provided in the control unit 6 is executed to find out an offset amount which corresponds to a bias component in a raw data production portion including the photoelectric conversion element D and the integral unit 5.

Figure 2:
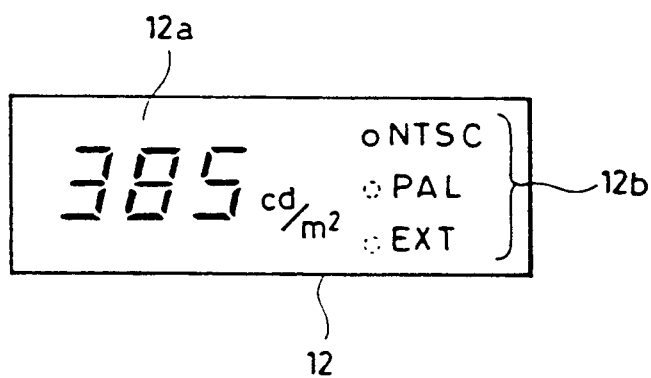
FIG. 2 is a diagram showing an example of displays provided on a display unit of the first luminance measurement device.

Referring to FIG. 2 showing an example of displays provided on the display unit 12, indicated at 12a is a measured luminance, indicated at 12b is a selected mode. The three modes are represented by "NTSC", "PAL", and "EXT" corresponding to the mode codes "1", "2", and "4" respectively.

Figure 3A:
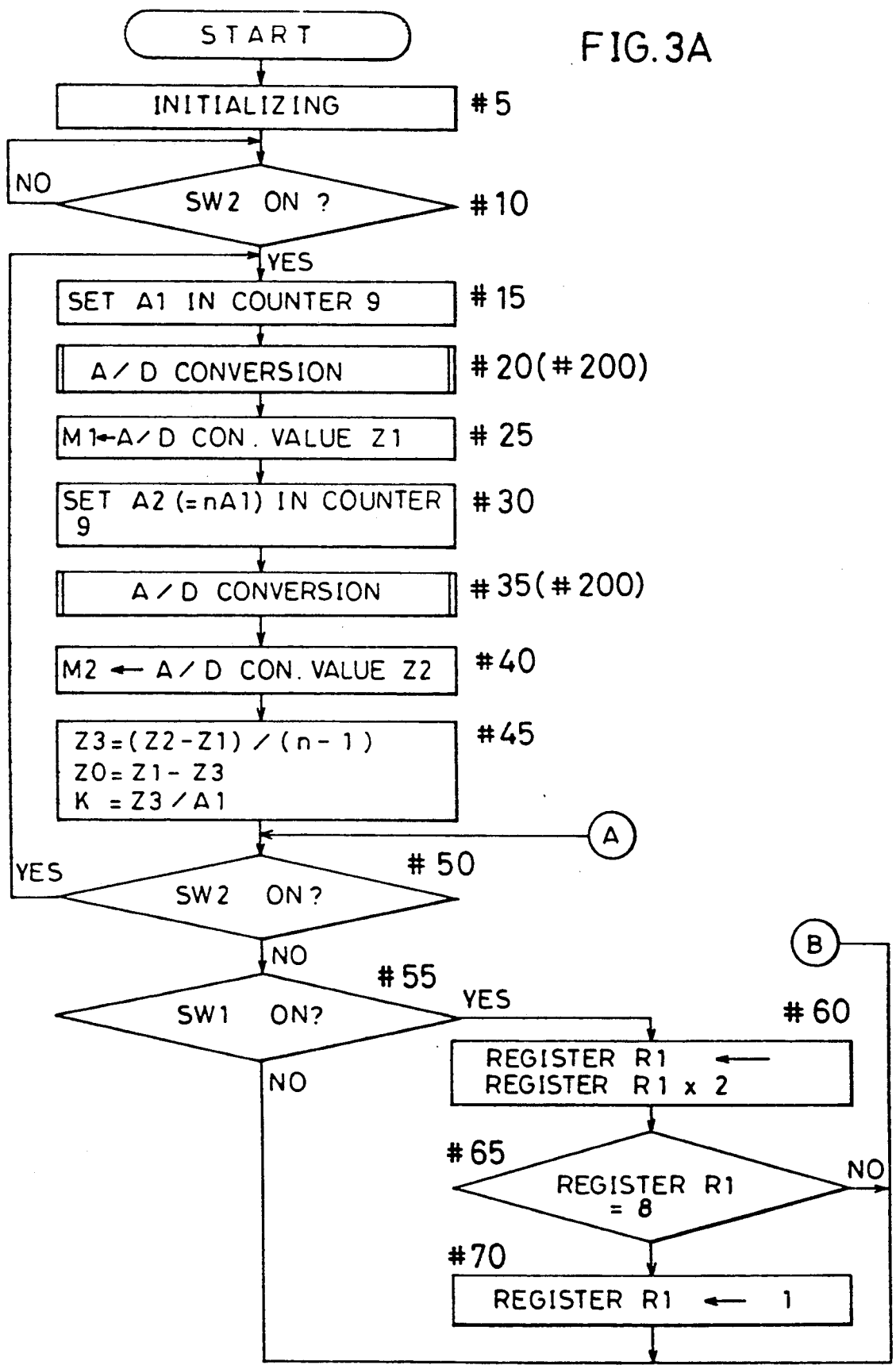
FIGS. 3A and 3B are a flowchart showing an operation routine of the first luminance measurement device.
Figure 3B:
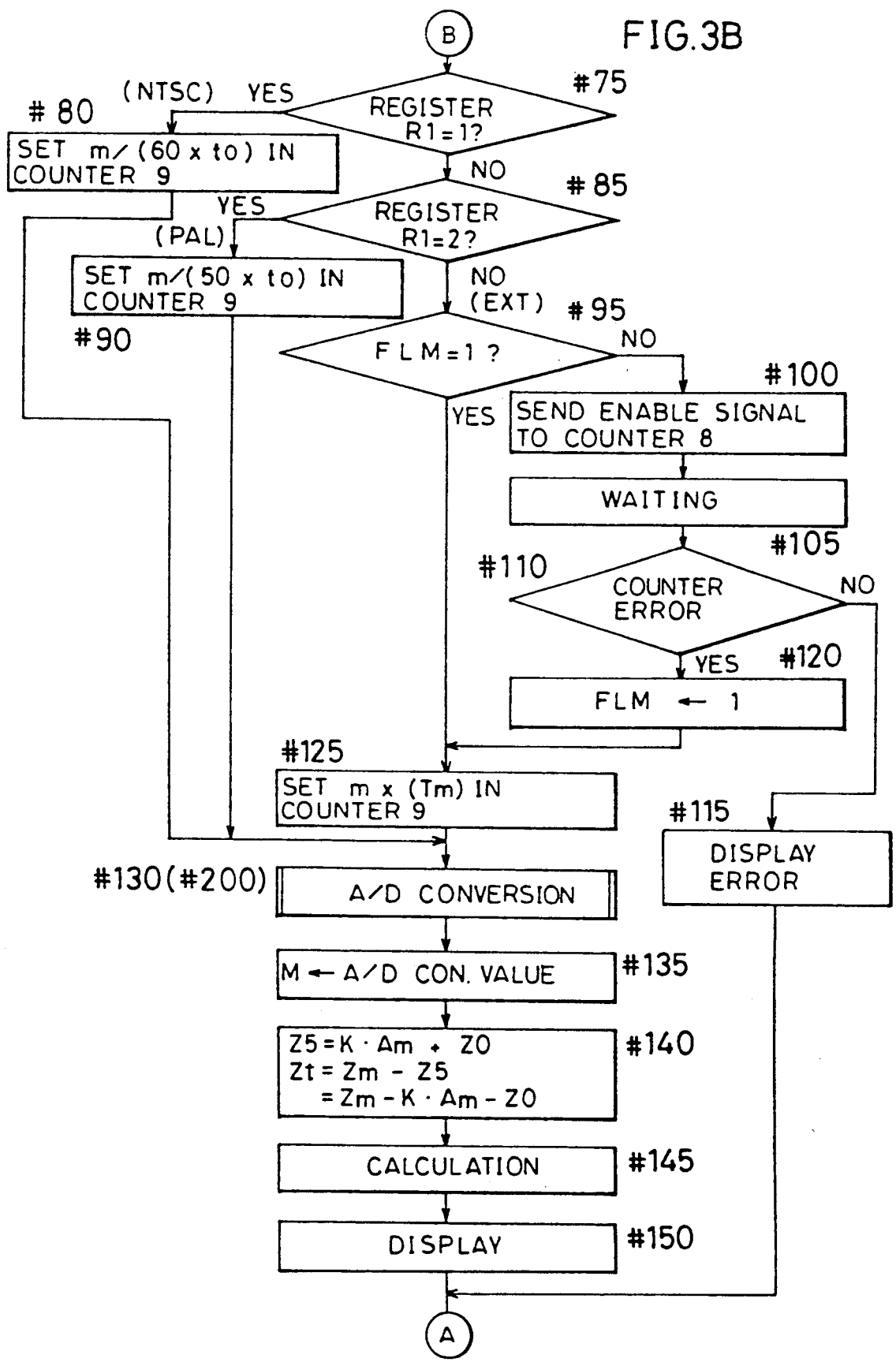

The measurement operation of the first luminance measurement device will be described with reference to a flowchart shown in FIGS. 3A and 3B.

In Step #5, first, this routine is initialized. Specifically, the register R1 of the control unit 6 is set at "1", a flag FLM of a register R2 being set at "0", and each output terminal of the control unit 6 being set at an initial state. Also, an indication of "zero calibration" is displayed on the display unit 12 to show that the zero calibration is carried out. The flag FLM is adopted for discriminating as to whether an interval time or pulse period of a synchronizing signal is measured in the EXT mode. When the flag FLM is "1", the pulse period measurement is executed. When the flag FLM is "0", the pulse period measurement is not executed. The zero calibration is carried out when the switch SW2 is turned on. In the zero calibration, the integral unit 5 is driven during a time when the photoelectric conversion element D receives no light in order to calculate an A/D conversion factor K per unit integral time of the raw data production portion.

After initializing, it is checked whether the switch SW2 is turned on (Step #10). When the switch SW2 is turned on, measurement for the above-mentioned zero calibration is started. Specifically, after a predetermined count value A1 is set in the counter 9 (Step #15), an A/D conversion subroutine is executed in which the integral unit 5 is driven for an integral time corresponding to the count value A1 when the photoelectric conversion element D receives no light (Step #20). After the A/D conversion is completed, an A/D converted value Z1 is stored in a register M1 of the control unit 6 (Step #25).

Subsequently, a count value A2 is set in the counter 9 (Step #30). The count value A2 is obtained by multiplying the count value A1 by n (n > 1). The integral unit 5 is driven for another integral time corresponding to the count value A2 (Step #35). After the A/D conversion, the A/D converted value Z2 is stored in a register M2 of the control unit 6 (Step #40).

In accordance with the following equations, the A/D conversion factor K and the bias component Z0 of the raw data production portion are calculated based on the A/D converted values Z1 and Z2 (Step #45):

$$Z3 = (Z2 - Z1)/(n - 1) \tag{1}$$

$$K = Z3/A1 \tag{2}$$

$$Z0 = Z1 - Z3 \tag{3}$$

Then, the A/D conversion factor K and the bias component Z0 are stored in register Mk and M0 of the control unit 6 respectively.

Figure 4:
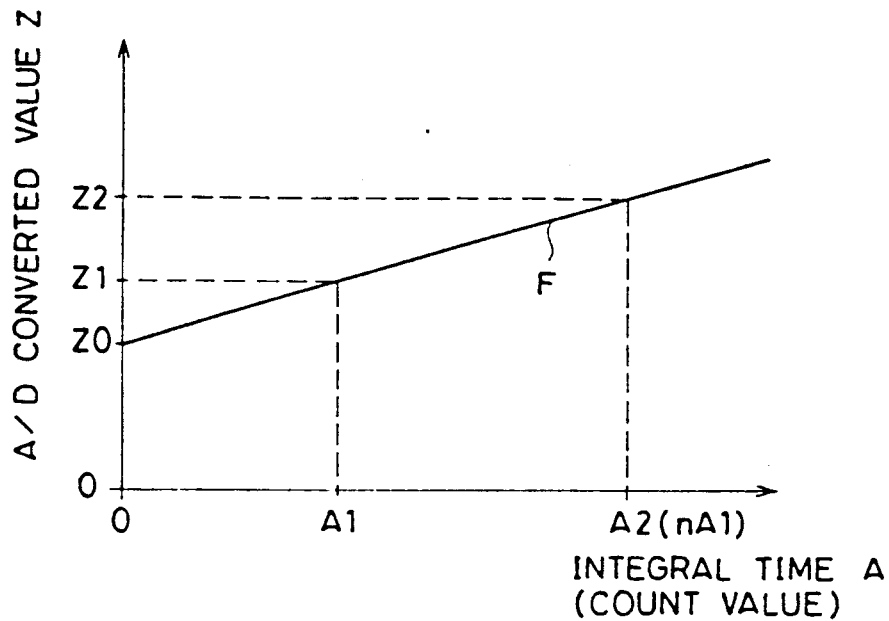
FIGS. 4 and 5 are graphs showing relationships between integral time and AD converted value.

It is usual that in a dual slope type integral circuit, an A/D converted value is proportional to an integral time. However, there is a likelihood that a bias component is included in an A/D converted value. FIG. 4 shows a relationship between an A/D converted value Z and an integral time when a photoelectric conversion element receives no light. The integral time along the horizontal axis corresponds to the count value A. In FIG. 4, the A/D converted values Z1 and Z2 are obtained at the integral times A1 and A2 respectively. The A/D converted value Z0 is the bias component which has no relationship with the integral time.

In FIG. 4, when an A/D converted value curve F is expressed by:

$$Z = K \cdot A - Z0.$$

the A/D conversion factor K can be expressed by the following equation:

$$K = (Z2 - Z1)/(A2 - A1) \quad (4)$$

Also, when the integral time A2 is expressed by:

$$A2 = n \cdot A1.$$

the equation (4) can be expressed as follows:

$$K = (Z2 - Z1)/(n - 1) \cdot 1/A1 \quad (5)$$

Further, when an A/D converted value Z3 is expressed by:

$$Z3 = (Z2 - Z1)/(n - 1)$$

the equation (5) can be expressed as follows:

$$K = Z3/A1$$

Thus, the above-mentioned equations (1) and (2) are obtained. Also, the A/D converted value curve F can be expressed as follows:

$$Z = K \cdot A - Z0 \quad (6)$$
$$= Z3 \cdot A/A1 - Z0 \quad (7)$$

When placing the integral time A1 and the A/D converted value Z1 in A and Z in the equation (7), the following equation is obtained:

$$Z1 = Z3 - Z0$$

From this equation, the above-mentioned equation (3) is thus obtained.

Referring to the flowchart of FIGS. 3A and 3B again, in Step #50, it is checked whether the switch SW2 is in the ON-state. When the switch SW2 is in the ON-state, this routine returns to Step #15. When in the OFF-state, this routine advances to Step #55 in which it is checked whether the switch SW1 is turned on. When the switch SW1 is turned on, the code of the register R1 is multiplied by 2 (Step #65). Subsequently, it is checked whether the multiplied code is "8". When the code is "8", the code of the register R1 is changed to "1" (Step #70). As mentioned above, the mode selection codes are stored in the register R1. As shown in Table 1, "NTSC", "PAL", and "EXT" are given the codes "1", "2", and "4", which increase by 2. Accordingly, in Steps of #60 to #70, the measurement modes are changed in the cycle of "NTSC", "PAL", to "EXT" each time turning on the switch SW1.

Either when the switch SW1 is in the OFF-state, or when a desired measurement mode is selected by turning on the switch SW1, an integral time Am corresponding to a measurement mode selected in Steps #75 to #85 is set in the counter 9. In other words, in Steps #75 and #85, it is determined which code is selected in the register R1.

When the measurement mode code is "1" (YES in Step #75), a selected mode is "NSTC". Accordingly, the integral time of $m/(60 \times t0)$ is set in the counter 9 (Step #80), in which "t0" is a period of the reference pulses sent from the reference pulse generator 10 and "m" is a predetermined integer. The counter 8 checks for the lapse of the integral time Am of m/60 seconds by counting down the number of reference pulses. In this case, the integral unit 5 is driven for m/60 second, in other words, for a vertical synchronizing signal period of "m". When "m" is "1", the measurement is performed in the fastest time.

When the measurement mode code is "2" (YES in Step #85), a selected mode is "PAL". Accordingly, the integral time of $m/(50 \times t0)$ is set in the counter 9 (Step #90).

When the measurement mode is "4" (NO in Step #85), a selected mode is "EXT". This routine advances to Step #95 in which it is discriminated whether the flag FLM is "1". When the flag FLM is "0" (NO in Step #95), a counter enable signal is sent to the counter 8 from the control unit 6 (Step #100).

In Step #105, this routine is held until the interval time Tm or pulse period of the vertical synchronizing signal is measured by the counter 8. The interval time Tm is measured because of the fact that in the "EXT" mode, the interval time of the vertical synchronizing signal is not a standardized value, in other words, neither 50 Hz nor 60 Hz. The counter 8 which is reset by the counter enable signal starts counting the number of reference pulses from the pulse generator 10 immediately after a first pulse of the synchronizing signal is input through the input terminal T1, and stops counting when a second pulse of the synchronizing signal is input, so that the interval time Tm of the vertical synchronizing signal is measured. It should be noted that the waiting time is set in such a longest interval time of a variety of CRTs having different vertical synchronizing signal interval times as to enable interval times Tm of all the CRTs to be measured.

In Step #110, it is checked whether there is an error in the counting of the counter 8. When there is an error, for example, a vertical synchronizing signal is not sent to the input terminal T1, an error indication is displayed on the display unit 12 (Step #115) and this routine returns to Step #50. When there is no error, the flag FLM is set in "1" (Step #120) and an integral time Am of $m \times Tm$ is set in the counter 9 (Step #125).

The integral unit 5 is driven for the integral time Am set in the counter 9 (Step #130) and the A/D converted value Zm is stored in a register Mm (Step #135). In Step #140, subsequently, an actual A/D converted value Zt for the integral time Am is calculated by subtracting an offset amount Z5 from the A/D converted value Zm (Step #140). The offset amount Z5 corresponds to a bias component of the integral unit 5.

Figure 5:
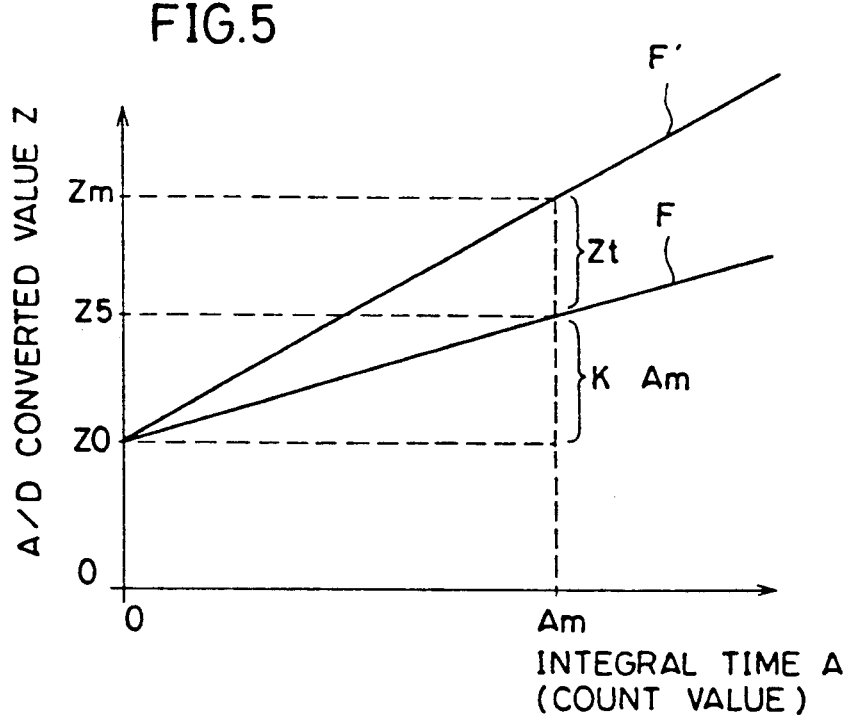

FIG. 5 shows a relationship between A/D converted values and integral times. An A/D converted value curve F' is obtained when the photoelectric conversion element D receives light from the fluorescent screen. The A/D converted value curve F shown in FIG. 4 is obtained when the photoelectric conversion element D does not receive light from the fluorescent screen.

FIG. 5 shows that an actual A/D converted value Zt corresponding to an actual glow is obtained by subtracting the offset amount Z5 from the A/D converted value Zm at the integral time Am. From the equation (7), the offset value Z5 can be expressed as follows:

$$Z5 = K \cdot Am - Z0.$$

Accordingly, the actual A/D converted value Zt can be obtained as follows:

$$\begin{aligned} Zt &= Zm - Z5 \\ &= Zm - K \cdot Am - Z0 \end{aligned} \quad (8)$$

The A/D conversion factor K and the A/D converted value Z0 in the equation (8) have already been calculated in Step #45 and stored in the registers Mk and M0 respectively. Accordingly, the actual A/D converted value Zt can be calculated in accordance with the equation (8).

Referring to the flowchart of FIGS. 3A and 3B again, after the actual A/D converted value Zt is obtained in Step #140, the luminance of the fluorescent screen of the CRT 2 is calculated based on the actual A/D converted value Zt in Step #145, and is displayed on the display unit 12. Thereafter, this routine returns to Step #50. The calculation of the luminance is not described in detail because it is not directly related to the present invention.

Figure 6:
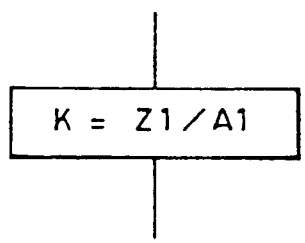
FIGS. 6 and 7 are diagrams showing steps of calculating an A/D converted value in the case of eliminating a bias component.
Figure 7:
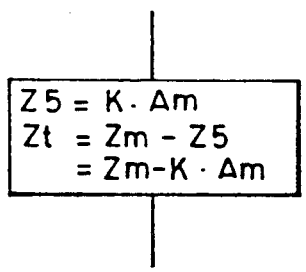

It will be seen that if a bias component can be eliminated by properly adjusting an integral unit, other calculations than the calculation of A/D conversion factor K are not required. An integral unit is driven one time only, so that the zero calibration can be practiced rapidly. Accordingly, in this case, Steps of #30 to #45 in the flowchart of FIG. 3 can be replaced with a step shown in FIG. 6. Step #140 can be also replaced with a step shown in FIG. 7. This means that the second measurement for the A/D converted value Z2 is eliminated and the A/D conversion factor K can be calculated from the A/D converted value Z1 in accordance with the equation:

$$K = Z1/A1$$

Also, the A/D converted value Z5 can be expressed as follows:

$$Z5 = K \times Am$$

Accordingly, the actual A/D converted value Zt can be obtained as follows:

$$\begin{aligned} Zt &= Zm - Z5 \\ &= Zm - K \times Am \\ &= Zm - Z1 \times Am/A1 \end{aligned} \quad (9)$$

Figure 8:
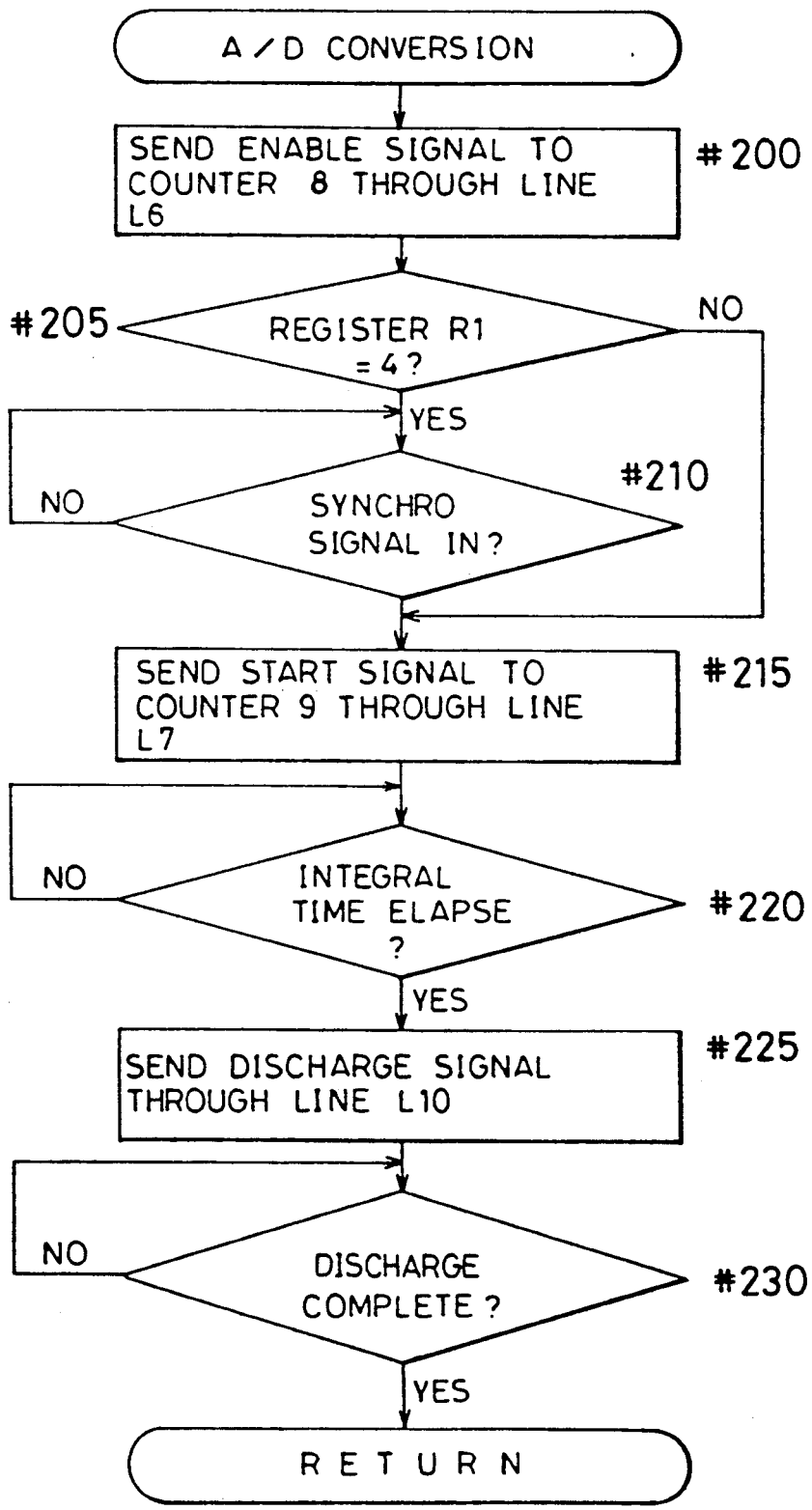
FIG. 8 is a flowchart showing a subroutine for an A/D conversion.

Next, the A/D conversion subroutine will be described with reference to FIG. 8. In Step #200, first, a counter enable signal is sent to the counter 8 from the control unit 6 through the signal line L6 so that the counter 8 measures the interval time of the vertical synchronizing signal sent in the input terminal T1. Subsequently, in Step #205, it is discriminated based on the code stored in the register R1 which mode is selected.

If the code is "4", i.e., the "EXT" mode, this subroutine is not started until the vertical synchronizing signal is input (Step #210). Upon receiving the vertical synchronizing signal, the counter 8 starts measuring the interval time Tm of the vertical synchronizing signal.

In Step #215, the trigger signal is sent to the counter 9 from the control unit 6 through the signal line L7. When receiving the trigger signal, the counter 9 makes the integral unit 5 start the integration. At the same time, the counter 9 starts counting down a set count value corresponding to the integral time in accordance with reference pulses from the reference pulse generator 10 (Step #220). When counting down to zero, the counter 9 makes the integral unit 5 stop the integration.

The integral unit 5 includes a dual slope integral circuit. Accordingly, the integrated charge is converted into a digital value by measuring a discharge time during which the integrated charge is discharged at a constant current. The discharge time is measured in the control unit 6.

Accordingly, when the integration is stopped, the control unit 6 sends the discharge signal to the integral unit 5 through the signal line L10 (Step #225). In response to the discharge signal, the integral unit 5 discharges the integrated charge at a constant current to convert the integrated charge into a digital value. In Step #230, it is discriminated whether the discharge is completed. This discrimination is carried out based on the discharge complete signal sent from the integral unit 5 to the control unit 6. The discharge time period from the sending of the discharge signal to the receiving of the discharge complete signal, is measured based on reference pulses sent from the reference pulse generator 10. It will be seen that the discharge time is an A/D converted value. The A/D converted value is stored in an appropriate register of the control unit 6. When the discharge is completed (YES in Step #230), this subroutine returns to the main routine. Also, it could be seen that as another means for measuring the discharge time, it is possible to provide a program counter in the control unit 6 in place of the reference pulse generator.

Figure 9:
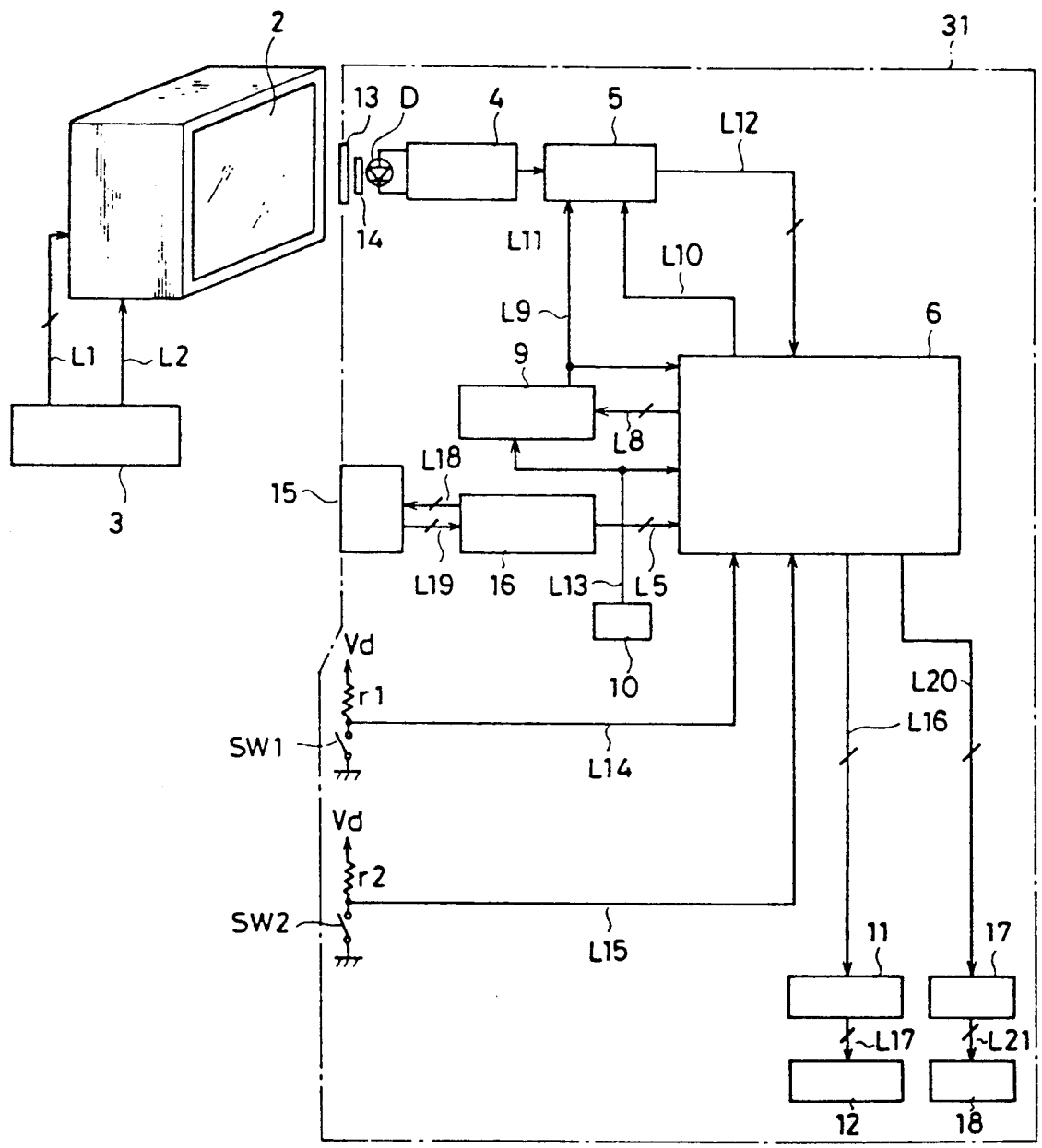
FIG. 9 is a diagram showing an overall measurement system using a second luminance measurement device of the present invention.

Next, a second luminance measurement device of the present invention will be described with reference to FIG. 9. In the first embodiment, a vertical synchronizing signal is input through the input terminal T1. In the second luminance measurement device, however, data concerning a vertical synchronizing signal is input by a keyboard. In FIG. 9, common reference numerals are given to parts identical to those of the first luminance measurement device.

Indicated at 31 is a second luminance measurement device of the present invention. Indicated at 15 is a keyboard including numeric keys or ten keys, an input start key, and an input end key. Inputted through the keyboard 15 is data concerning the frequency of a vertical synchronizing signal for the CRT 2, or the interval time of the vertical synchronizing signal.

Indicated at 16 is a register for storing the data input through the keyboard 15. In storing the input data in the register 16, pressed keys are discriminated by sending a strobe signal to the keyboard 15 through a signal line L18 and receiving a return signal from the keyboard 15 through a signal line L19. The input data is then sent to a control unit 6 through a signal line L5. Further, the input data is sent from the control unit 6 to a display driver 17 through a signal line L20, and finally sent to a display unit 18 to display the data.

The measurement operation of the second luminance measurement device is basically identical to that of the first luminance measurement device. Accordingly, the measurement operation follows the flowcharts of FIGS. 3 and 8 except for not having Step #200 in which the interval time of the vertical synchronizing signal is measured upon receiving a counter enable signal.

Figure 10:
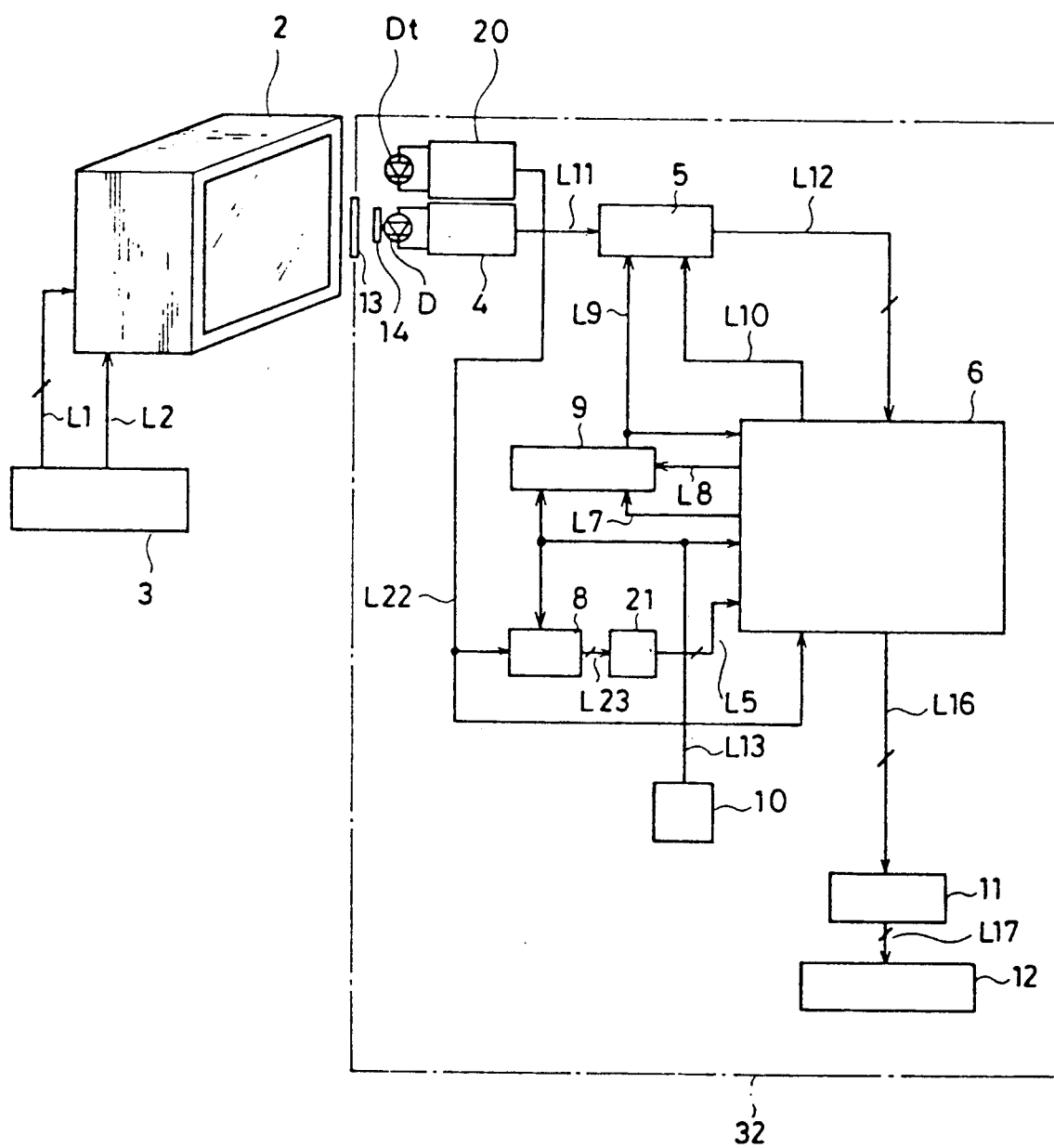
FIG. 10 is a diagram showing an overall measurement system using a third luminance measurement device of the present invention.

A third luminance measurement device of the present invention will be described with reference to FIG. 10. In the third luminance measurement device, data concerning a vertical synchronizing signal is obtained based on a picked-up light from the fluorescent screen of the CRT 2, instead of sending the vertical synchronizing signal through the input terminal, or inputting vertical synchronizing signal data through the keyboard.

There are two types of fluorescent substance. One is a fluorescent substance having short persistences of about 10 microseconds. The other is a fluorescent substance having long persistences of a few milliseconds to some tens milliseconds. The third luminance measurement device is useful for CRT having a screen coated with short persistence fluorescent substance. In FIG. 10, common reference numerals are given to parts identical to those of the first luminance measurement device.

Indicated at 32 is a third luminance measurement device of the present invention. A photoelectric conversion element Dt is arranged in such a way as to receive light from a portion Bt above a portion B of the fluorescent screen of the CRT 2. The portion B is a portion from which the photoelectric conversion element D receives light.

Indicated at 20 is an impedance transformer for making an output of the photoelectric conversion element Dt correspond to an input level of the succeeding circuit units. The photoelectric conversion element Dt detects glowings of the fluorescent substance which correspond to pulses of the vertical synchronizing signal of the CRT 2. The detected glowings are sent from the impedance transformer 20 to a counter 8 and a control unit 6 through a signal line L22.

The counter 8 finds out an interval time of the glowings by counting the number of reference pulses sent from a reference pulse generator 10. Each time an interval time is found out, the interval time is stored in a latch circuit (not shown) in the counter 8. In other words, a glowing period of the fluorescent substance on the CRT 2 obtained by the photoelectric conversion element Dt is stored in the latch circuit in the counter 8.

Indicated at 21 is a calculation unit which receives the glowing period from the latch circuit and divides it by N ($N \geq 2$) to produce divided data Tn. The divided data is sent to the control unit 6 through a signal line L5. The divided data is set in the counter 9 by the control unit 6 when practicing zero calibration and luminance measurement as described later.

Figure 11:
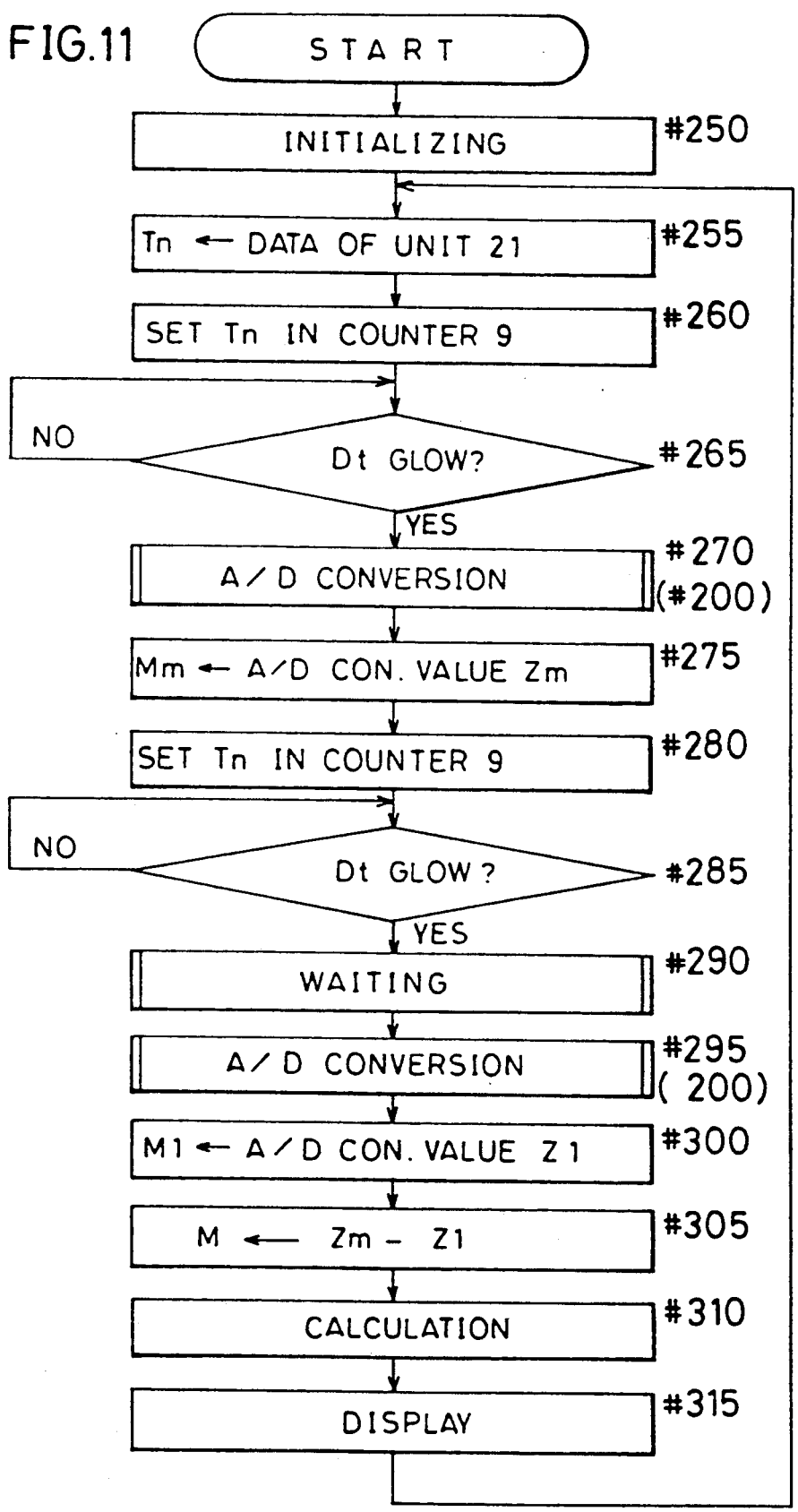
FIG. 11 is a flowchart showing an operation routine of the third luminance measurement device.

Referring to FIG. 11 showing a flowchart of a measurement operation routine of the third luminance measurement device, after initializing (Step #250), divided data Tn is stored in a register R3 of the control unit 6 (Step #255). The divided data Tn is obtained by dividing a glowing period by N as described above. Also, the divided data is set in the counter 9 (Step #260).

In Step #265, it is checked whether the photoelectric conversion element Dt receives light from the fluorescent screen of the CRT 2. When the photoelectric conversion element Dt receives light (YES in Step #265), and A/D conversion subroutine is executed at the same time to calculate an A/D converted value Zm (Step #270). The A/D converted value is then stored in a register Mm (Step #275).

The divided data stored in the register R3 is set in the counter 9 again (Step #280). In Step #285, it is checked whether the photoelectric conversion element Dt receives light from the fluorescent screen of the CRT 2. When the photoelectric conversion element Dt receives light (YES in Step #285), the A/D conversion subroutine is executed after the lapse of a waiting time corresponding to the divided data Tn (Step #290, Step #295). The A/D conversion subroutine executed to calculate an A/D converted value Z1 which is then stored in a register M1 (Step #300).

Subsequently, an A/D converted value Zt for actual glowing is calculated by subtracting the A/D converted value Z1 from the A/D converted value Zm, and stored in a register M (Step #305). The luminace of the fluorescent screen of the CRT 2 is calculated based on the actual A/D converted value Zt, and then displayed on the display unit 12 (Step #315). Thereafter, this routine returns to Step #255.

As described above, the photoelectric conversion element Dt is arranged in such a way as to receive light from the fluorescent portion Bt above the fluorescent portion B from which the photoelectric conversion element D receives light. Accordingly, the fluorescent portion B glows at a time period relatively immediately after the fluorescent portion Bt glows in one vertical scanning cycle.

In a first measurement of Steps #260 to #270, the integral unit 5 is driven for a time corresponding to the divided data Tn immediately after the photoelectric conversion element Dt receives the glowing light of the fluorescent portion Bt, so that the glowing light of the fluorescent portion B is received by the photoelectric conversion element D. The time corresponding to the divided data Tn is half or less than a pulse period of the vertical synchronizing signal.

In a second measurement of Steps #280 to #295, the integral unit 5 is driven after the lapse of the time corresponding to the divided data Tn after the photoelectric conversion element Dt receives the glowing light of the fluorescent portion Bt. Accordingly, the photoelectric conversion element D does not receive the glowing light of the fluorescent portion B. In other words, the second measurement provides an offset amount of the raw data production portion.

Also, it will be seen that it is applicable to arbitrarily set a first integral time for receiving the glowing light of the fluorescent portion B and a second time for receiving no glowing light of the fluorescent portion B based on the positional distance between the fluorescent portion B and the fluorescent portion Bt, a total of the first integral time and the second integral time being shorter than the pulse period of the vertical synchronizing signal. The integral unit 5 is driven in accordance with the first integral time and the second integral time.

Although integrated electrical energies are converted to digital values in the above-mentioned embodiments, it will be apparent that the integrated electrical energies can be used in analog for measuring the luminance of the fluorescent screen of a cathode ray tube.

Furthermore, it should be understood that the foregoing relates to only the scope of the present invention as defined by the appended claims rather than by the description preceding them, and all changes that fall within metes and bounds of the claims, or equivalence of such metes and bounds are therefore intended to be embraced by the claims.

What is claimed is:

1. A device for measuring a luminance of a screen of an image display device comprising:
   photoelectric conversion means for receiving light from the screen and converting the light to electrical energy;
   integral means for integrating the electrical energy;
   glowing interval time measurement means for measuring the glowing interval time of the image display device; and
   control means for controlling the integral means so as to integrate the electrical energy for a scanning integral time corresponding to the measured interval time.

2. A device according to claim 1 wherein the glowing interval time measurement means includes synchronizing signal reception means for receiving a synchronizing signal for the image display device, whereby the glowing interval time measurement means finds out the glowing interval time based on the interval time of the received synchronizing signal.

3. A device according to claim 1 wherein the glowing interval time measurement means includes glowing detection means for detecting glowings of the screen, whereby the glowing interval time measurement means finds out the glowing interval time based on the detected glowings.

4. A device according to claim 3 further comprising:
   integral time setting means for setting an integral time shorter than the glowing interval time;
   first integral enable signal generator means for generating a first integral enable signal for enabling the photoelectric conversion means to receive a glowing light of the screen within the set integral time at a first integral timing;
   second integral enable signal generator means for generating a second integral enable signal for enabling the photoelectric conversion means to receive no light from the screen within the set integral time at a second integral timing, the integral means being responsive to the first integral enable signal generator means and the second integral enable signal generator means for integrating electrical energies for the set integral time; and
   calculation means for calculating a true integrated electrical energy by subtracting the second integrated electrical energy corresponding to the second integral enable signal from the first integrated electrical energy corresponding to the first integral enable signal.

5. A device for measuring a luminance of a screen of an image display device comprising:
   photoelectric conversion means for receiving light from the screen and converting the light to electrical energy;
   integral means for integrating the electrical energy;
   first setting means for setting a first integral time, the first integral time being determined before measuring the luminance;
   second setting means for setting a second integral time, the second setting means including glowing interval time measurement means for measuring the glowing interval time of the image display device, the second integral time corresponding to the measured glowing interval time;
   selection means for selecting one of the first setting means and the second setting means; and
   control means for controlling the integral means so as to integrate the electrical energy for a scanning integral time corresponding to the integral time set by a selected setting means.

6. A device according to claim 5 wherein the glowing interval time measurement means includes synchronizing signal reception means for receiving a synchronizing signal for the image display device, whereby the glowing interval time measurement means finds out the glowing interval time based on the interval time of the received synchronizing signal.

7. A device for measuring a luminance of a screen of an image display device comprising:
   photoelectric conversion means for receiving light from the screen and converting the light to electrical energy;
   integral means for integrating the electrical energy;
   input means for inputting data corresponding to the glowing interval time of the image display device;
   calculating means for calculating the glowing interval time base on the input data; and
   control means for controlling the integral means so as to integrate the electrical energy for a scanning integral time corresponding to the calculated glowing interval time.

8. A device according to claim 7 wherein the input data is the frequency of a synchronizing signal for the image display device.

9. A device according to claim 1 further comprising:
   second control means for controlling the photoelectric conversion means so as to output an internal electric energy of the photoelectric conversion means when in a state of receiving no light from the screen, controlling the integral means so as to integrate the internal electric energy for a predetermined time to produce a secondary integrated electrical energy; and
   calculation means for calculating a true integrated electrical energy based on the scanning integral time, the predetermined time, and the secondary integrated electrical energy.

10. A device according to claim 9 wherein the calculation means includes:
    first calculation means for calculating an integrated electrical energy per unit time based on the secondary integrated electrical energy and the predetermined time; and
    second calculation means for calculating a compensation integrated electrical energy by multiplying the integrated electrical energy per unit time by the scanning integral time, and calculating a true integrated electrical energy by subtracting the compensation integrated electrical energy from the general integrated electrical energy.

11. A device according to claim 5 further comprising:
    second control means for controlling the photoelectric conversion means so as to output an internal electric energy of the photoelectric conversion means when in a state of receiving no light from the screen, controlling the integral means so as to integrate the internal electric energy for a predetermined time to produce a secondary integrated electrical energy; and
    calculation means for calculating a true integrated electrical energy based on the scanning integral time, the predetermined time, and the secondary integrated electrical energy.

12. A device according to claim 11 wherein the calculation means includes:
first calculation means for calculating an integrated electrical energy per unit time based on the secondary integrated electrical energy and the predetermined time; and
second calculation means for calculating a compensation integrated electrical energy by multiplying the integrated electrical energy per unit time by the scanning integral time, and calculating a true integrated electrical energy by subtracting the compensation integrated electrical energy from the general integrated electrical energy.

13. A device according to claim 7 further comprising:
second control means for controlling the photoelectric conversion means so as to output an internal electric energy of the photoelectric conversion means when in a state of receiving no light from the screen, controlling the integral means so as to integrate the internal electric energy for a predetermined time to produce a secondary integrated electrical energy; and
calculation means for calculating a true integrated electrical energy based on the scanning integral time, the predetermined time, and the secondary integrated electrical energy.

14. A device according to claim 13 wherein the calculation means includes:
first calculation means for calculating an integrated electrical energy per unit time based on the secondary integrated electrical energy and the predetermined time; and
second calculation means for calculating a compensation integrated electrical energy by multiplying the integrated electrical energy per unit time by the scanning integral time, and calculating a true integrated electrical energy by subtracting the compensation integrated electrical energy from the general integrated electrical energy.

15. A device according to claim 1 further comprising:
second control means for controlling the photoelectric conversion means so as to output an internal electric energy of the photoelectric conversion means when in a state of receiving no light from the screen, controlling the integral means so as to integrate the internal electric energy for a first predetermined time to produce a first secondary integrated electrical energy;
third control means for controlling the photoelectric conversion means so as to output the internal electric energy of the photoelectric conversion means when in a state of receiving no light from the screen, controlling the integral means so as to integrate the internal electric energy for a second predetermined time different from the first predetermined time to produce a second secondary integrated electrical energy;
storage means for storing the first secondary integrated electrical energy and the second secondary integrated electrical energy; and
calculation means for calculating a true integrated electrical energy based on the integral time, the first predetermined time, the second predetermined time, the first secondary integrated electrical energy, and the second secondary integrated electrical energy.

16. A device according to claim 15 wherein the calculation means includes:
first calculation means for calculating an integrated electrical energy per unit time and an offset integrated electrical energy based on the first secondary integrated electrical energy, the second secondary integrated electrical energy, the first predetermined time, and the second predetermined time; and
second calculation means for calculating a compensation integrated electrical energy by multiplying the integrated electrical energy per unit time by the scanning integral time, and calculating a true integrated electrical energy by subtracting the compensation integrated electrical energy and the offset integrated electrical energy from the general integrated electrical energy.

17. A device according to claim 5 further comprising:
second control means for controlling the photoelectric conversion means so as to output an internal electric energy of the photoelectric conversion means when in a state of receiving no light from the screen, controlling the integral means so as to integrate the internal electric energy for a first predetermined time to produce a first secondary integrated electrical energy;
third control means for controlling the photoelectric conversion means so as to output the internal electric energy of the photoelectric conversion means when in a state of receiving no light from the screen, controlling the integral means so as to integrate the internal electric energy for a second predetermined time different from the first predetermined time to produce a second secondary integrated electrical energy;
storage means for storing the first secondary integrated electrical energy and the second secondary integrated electrical energy; and
calculation means for calculating a true integrated electrical energy based on the scanning integral time, the first predetermined time, the second predetermined time, the first secondary integrated electrical energy, and the second secondary integrated electrical energy.

18. A device according to claim 17 wherein the calculation means includes:
first calculation means for calculating an integrated electrical energy per unit time and an offset integrated electrical energy based on the first secondary integrated electrical energy, the second secondary integrated electrical energy, the first predetermined time, and the second predetermined time; and
second calculation means for calculating a compensation integrated electrical energy by multiplying the integrated electrical energy per unit time by the scanning integral time, and calculating a true integrated electrical energy by subtracting the compensation integrated electrical energy and the offset integrated electrical energy from the general integrated electrical energy.

19. A device according to claim 7 further comprising:
second control means for controlling the photoelectric conversion means so as to output an internal electric energy of the photoelectric conversion means when in a state of receiving no light from the screen, controlling the integral means so as to integrate the internal electric energy for a first predetermined time to produce a first secondary integrated electrical energy;

third control means for controlling the photoelectric conversion means so as to output the internal electric energy of the photoelectric conversion means when in a state of receiving no light from the screen, controlling the integral means so as to integrate the internal electric energy for a second predetermined time different from the first predetermined time to produce a second secondary integrated electrical energy;

storage means for storing the first secondary integrated electrical energy and the second secondary integrated electrical energy; and calculation means for calculating a true integrated electrical energy based on the scanning integral time, the first predetermined time, the second predetermined time, the first secondary integrated electrical energy, and the second secondary integrated electrical energy.

20. A device according to claim 19 wherein the calculation means includes:

first calculation means for calculating an integrated electrical energy per unit time and an offset integrated electrical energy based on the first secondary integrated electrical energy, the second secondary integrated electrical energy, the first predetermined time, and the second predetermined time; and second calculation means for calculating a compensation integrated electrical energy by multiplying the integrated electrical energy per unit time by the scanning integral time, and calculating a true integrated electrical energy by subtracting the compensation integrated electrical energy and the offset integrated electrical energy from the general integrated electrical energy.

21. A device for measuring a luminance of a screen of an image display device comprising:

photoelectric conversion means for receiving light from the screen and converting the light to electrical energy;

glowing detection means spaced apart from the photoelectric conversion means at a predetermined distance for detecting glowings of the screen;

first calculation means for calculating a glowing interval time of the image display device based on the detected glowings;

integral time setting means for setting an integral time shorter than the calculated glowing interval time;

first integral enable signal generator means for calculating, based on the predetermined distance and the set integral time, a first integral time to enable the photoelectric conversion means to receive a glowing light of the screen within the set integral time, and generating a first integral enable signal at the calculated first integral time;

second integral enable signal generator means for calculating, based on the predetermined distance and the set integral time, a second integral time to enable the photoelectric conversion means to receive no light from the screen within the set integral time, and generating a second integral enable signal at the calculated second integral time;

integral means responsive to the first integral enable signal generator means and the second integral enable signal generator means for producing a first integrated electrical energy corresponding to the first integral enable signal and a second integrated electrical energy corresponding to the second integral enable signal; and second calculation means for calculating a true integrated electrical energy by subtracting the second integrated electrical energy from the first integrated electrical energy.

22. A device for measuring a luminance of a screen of a an image display device comprising:

photoelectric conversion means for receiving light from the screen and converting the light to electrical energy;

integral means for integrating electrical energy;

first control means for controlling the integral means so as to integrate the electrical energy for a first integral time to produce a first integrated electrical energy;

second control means for controlling the photoelectric conversion means so as to output an internal electric energy of the photoelectric conversion means when in a state of receiving no light from the screen, and controlling the integral means so as to integrate the internal electric energy for a second integral time to produce a second integrated electrical energy; and calculation means for calculating a true integrated electrical energy based on the first integral time, the second integral time, the first integrated electrical energy, and the second integrated electrical energy.

23. A device according to claim 22 wherein the calculation means includes:

first calculation means for calculating an integrated electrical energy per unit time based on the second integrated electrical energy and the second integral time; and second calculation means for calculating a compensation integrated electrical energy by multiplying the integrated electrical energy per unit time by the first integral time, and calculating a true integrated electrical energy by subtracting the compensation integrated electrical energy from the first integrated electrical energy.

24. A device for measuring a luminance of a screen of an image display device comprising:

photoelectric conversion means for receiving light from the screen and converting the light to electrical energy;

integral means for integrating electrical energy;

first control means for controlling the integral means so as to integrate the electrical energy for a first integral time to produce a first integrated electrical energy;

second control means for controlling the photoelectric conversion means so as to output an internal electric energy of the photoelectric conversion means when in a state of receiving no light from the screen, and controlling the integral means so as to integrate the internal electric energy for a second integral time to produce a second integrated electrical energy;

third control means for controlling the photoelectric conversion means so as to output the internal electric energy of the photoelectric conversion means when in a state of receiving no light from the screen, controlling the integral means so as to integrate the internal electric energy for a third integral time different from the second integral time to produce a third integrated electrical energy;

storage means for storing the first integrated electrical energy, the second integrated electrical energy, and the third integrated electrical energy; and calculation means for calculating a true integrated electrical energy based on the first integral time, the second integral time, the third integral time, the first integrated electrical energy, the second integrated electrical energy, and the third integrated electrical energy.

25. A device according to claim 24 wherein the calculation means includes:

first calculation means for calculating an integrated electrical energy per unit time and an offset integrated electrical energy based on the second integrated electrical energy, the third integrated electrical energy, the second integral time, and the third integral time; and second calculation means for calculating a compensation integrated electrical energy by multiplying the integrated electrical energy per unit time by the first integral time, and calculating a true integrated electrical energy by subtracting the compensation integrated electrical energy and the offset integrated electrical energy from the first integrated electrical energy.

* * * * *